UNITED STATES PATENT OFFICE.

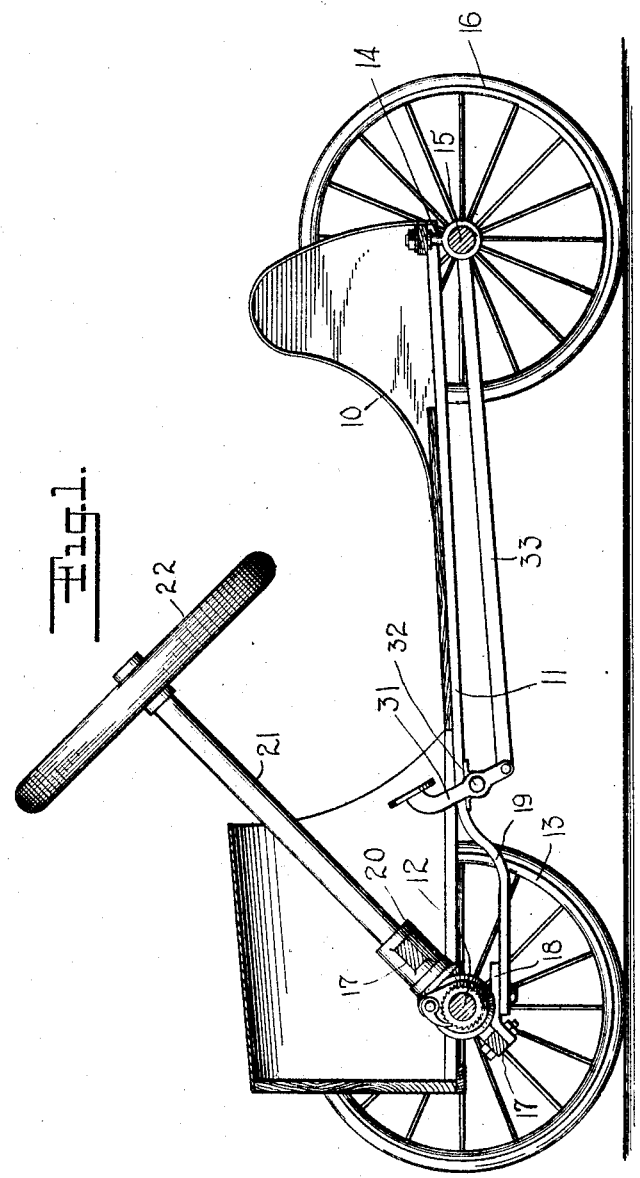

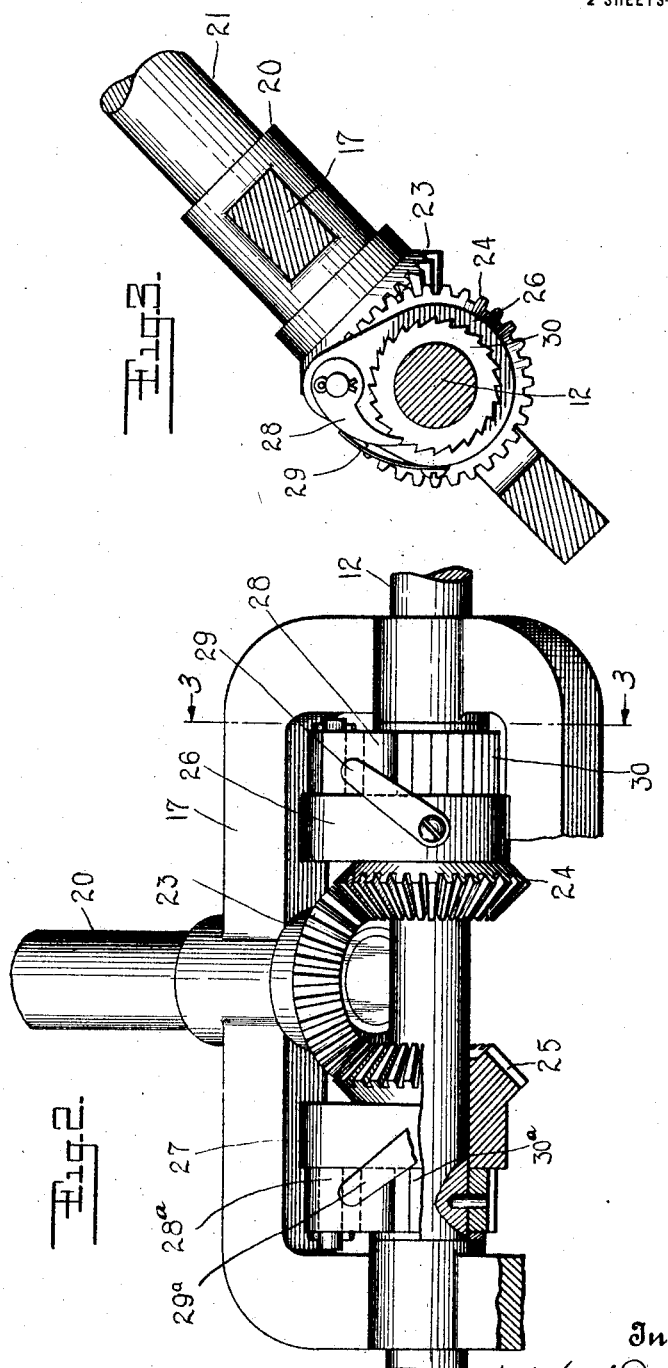

WINFIELD D. SMITH, OF NEWARK, NEW JERSEY.

MANUALLY-PROPELLED VEHICLE.

1,326,697.  Specification of Letters Patent.  Patented Dec. 30, 1919.

Application filed February 27, 1919. Serial No. 279,630.

*To all whom it may concern:*

Be it known that I, WINFIELD D. SMITH, a citizen of the United States, and a resident of the city of Newark, county of Essex, and State of New Jersey, have invented a new and useful Improvement in Manually-Propelled Vehicles, of which the following is a full, clear, and exact description.

My invention relates to improvements in manually operated vehicles, and the object of my invention is to produce a vehicle which is inexpensive and useful, and by which the operator can by the oscillation of a wheel within convenient reach, cause a constant motion to be imparted to an axle of the vehicle, and so to the vehicle itself. My intention is to make a simple form of hand propelled vehicle of this kind which makes a very attractive vehicle for children, and which can also be used to advantage by grown people in a wheel chair or other form of vehicle, and has the further advantage that a person who is lame or cannot conveniently use his feet or legs, can very effectually propel the vehicle. The invention is also intended to produce a structure of the kind in which by means of foot pedals the vehicle can be conveniently steered. The vehicle can be made, so far as its body is concerned, in any suitable design, and from the description which follows it will be seen that a very simple and efficient structure can be produced along the general lines indicated.

Reference is to be had to the accompanying drawings forming a part of this specification, in which similar reference characters indicate corresponding parts in all the views.

Figure 1 is a longitudinal sectional elevation of a vehicle embodying my invention.

Fig. 2 is a broken enlarged detail plan of the driving gearing, and

Fig. 3 is a cross section on the line 3—3 of Fig. 2.

The body 10 of the vehicle can be made obviously in any design to suit the taste or requirements of various individuals, and it is provided with a suitable framework 11, and this is supported in the usual or any convenient way on the front axle 12 which has wheels 13 affixed thereto, while the rear end of the frame has a king-bolt connection 14 with the axle 15 which is provided with wheels 16. The object of the king-bolt connection in the gear is to provide for steering, as will hereafter appear. Pivotally supported on the front axle 12 is a yoke or framework 17 which is held in place by connecting it in any convenient way with the frame of the vehicle, and I have shown it provided with a bracket 18 which connects with a downwardly extending part 19 of the frame 11. This yoke or frame 17 has a sleeve or bearing 20 to receive the driving shaft 21 which is preferably arranged at an angle as shown in Fig. 1, so as to bring the operating wheel 22 within convenient reach of the person seated in the vehicle body.

At its lower end the driving shaft 21 is provided with a gear wheel 23 which meshes with gears 24 and 25, and these are journaled so as to turn on the axle 12 as the drawing shows. The gear wheel 24 is provided with a collar 26, and the gear wheel 25 with a similar collar 27. The first mentioned collar carries a pawl 28 which is pressed by a spring 29 into engagement with a ratchet wheel 30, and this is fast on the shaft 12. The collar 27 of the gear wheel 25 has a similar pawl 28$^a$ which is pressed by the spring 29$^a$ into engagement with the ratchet wheel 30$^a$, and this is also fast on the axle 12. Thus when the wheel 22 and gear wheel 23 are turned in one direction, the wheels 24 and 25 are both rotated, but in opposite directions, and the wheel 24 will by the pawl 28 impart motion to the ratchet wheel 30 and axle 12, while the other draws back the pawl 28$^a$ over the ratchet wheel 30$^a$, and on the return oscillation of the wheel 22 and gear 23 the motion will be reversed, and the pawl 28$^a$ then imparts motion to the ratchet wheel 30$^a$ and axle 12, but a constant movement is imparted to the axle 12. This movement in itself is not new, but the arrangement of this movement in connection with a driving shaft and wheel as specified in a vehicle of this sort, is believed to be new, and the particular arrangement of the gears and ratchet wheels can therefore be departed from without affecting the principle of the invention, but the general arrangement should be preserved so that the oscillation of the driving shaft will by means of the gear and ratchet connection impart a constant forward motion to the axle 12.

In order that the vehicle may be conveniently steered, I depart from the usual vehicle construction and have the king bolt connection between the vehicle body and the rear axle 15. I also provide foot pedals 31—only one is shown in the drawings—but they are arranged in pairs near opposite sides of the vehicle body, and each is pivoted as shown at 32 and connected by a rod 33 with the rear axle. Thus by pressing one of the pedals 31 the rear axle may be swiveled on its king-pin and the vehicle steered.

A vehicle of this kind can be very conveniently adapted to suit many requirements. For small children the gears 23, 24 and 25 are preferably of similar size so that the vehicle will operate easily, but not with great speed, whereas for older and stronger people the gear 23 can be made much larger than the gear 24—in other words the vehicle can be geared up, and to compensate for the extra power required, the wheel 22 can be made larger also.

It will be seen that the arrangement disclosed provides for a very simple and inexpensive vehicle which can be readily driven by the hands and steered by the feet, and thus people who have imperfections in their feet or legs can in a vehicle of this sort, propel themselves readily and get needed exercise.

I claim:—

1. A wheeled vehicle having an oscillatable driving shaft extending upward generally perpendicular to the forward axle, and a gear and ratchet connection between the driving shaft and the axle by which the oscillations of the driving shaft impart a constant motion to the axle.

2. A wheeled vehicle having an oscillatable driving shaft held to extend upward from the forward axle, a frame pivoted on the axle in which the driving shaft is journaled, and a gear and ratchet connection between the driving shaft and the axle by which the oscillations of the driving shaft impart a constant motion to the axle.

3. A wheeled vehicle having front and rear axles, a frame pivoted on the front axle and connected also with the frame of the vehicle body, an oscillatable driving shaft supported in the aforesaid frame, a gear on the lower end of the driving shaft, gears loosely mounted on the axle and connected with the driving gear, and pawl and ratchet connections between the aforesaid loose gears and the front axle.

WINFIELD D. SMITH.

Witnesses:
WARREN B. HUTCHINSON,
ROBT. F. CONLEY.